Figure 1:
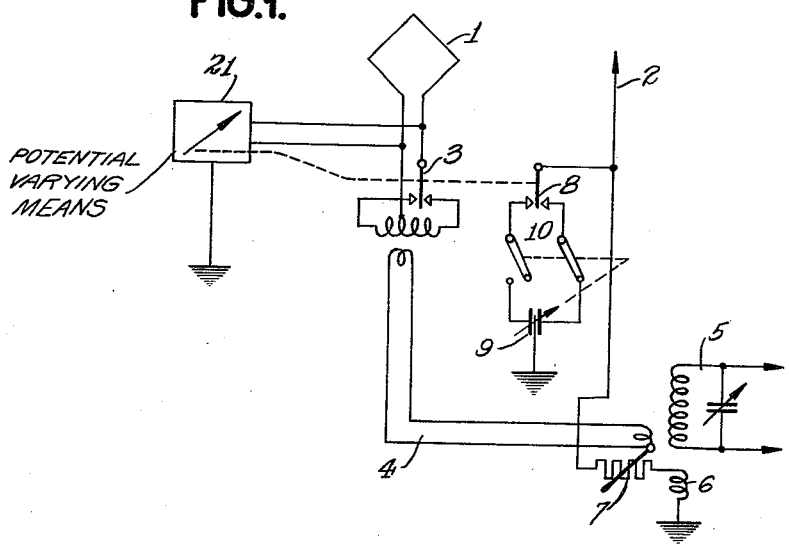

Nov. 26, 1940.  B. KALZ  2,223,069

RADIO DIRECTION FINDING SYSTEM

Filed May 11, 1939

INVENTOR.
BRUNO KALZ
BY RCHopgood
ATTORNEY.

Patented Nov. 26, 1940

2,223,069

UNITED STATES PATENT OFFICE 2,223,069

RADIO DIRECTION FINDING SYSTEM

Bruno Kalz, Dabendorf, Kreis Teltow, Germany, assignor to C. Lorenz Aktiengesellschaft, Berlin-Tempelhof, Lorenzweg, Germany, a company Application May 11, 1939, Serial No. 272,971
In Germany May 17, 1938

5 Claims. (Cl. 250—11)

This invention briefly relates to radio direction finding systems, and more particularly to improvements in or releating to radio receivers for obtaining bearings.

Several direction finding receiver systems are known in the art, and one type of such devices operates with a directional frame antenna and a non-directional auxiliary antenna, which two antenna means are alternately caused to operate in phase coincidence and phase opposition. The field intensities of electromagnetic waves radiated from a non-directional transmitter and picked up by the frame antenna and the auxiliary antenna in their state of phase coincidence or phase opposition are then compared with one another either acoustically in a telephone receiver, or optically by means of an indicating instrument, for example, in order to determine the position of the receiver relative to the transmitter. The above mentioned alternate operation of the antenna means in phase coincidence and phase opposition is preferably effected in such manner that the phase of the frame antenna is subjected to a reversal in a change-over device, while the auxiliary non-directional antenna is continually maintained coupled with the input circuit of the receiver. In response to the operation of the change-over device, differently directed and mutually intersecting diagrams of cardioidal shape are alternately produced, whereby the straight line traced through the points of intersection of the diagrams and through the center point of the receiving system defines the maximum direction of action or course line.

The maximum direction of action of the heretofore used direction finding systems is effective perpendicular to the plane of the frame antenna or aerial. Because of the fact that this frame antenna, when installed on an aeroplane, generally forms right angles with the longitudinal axis of the aeroplane, this axis exactly coincides with the direction of maximum action, that is, the direction in which the transmitter is located. This fixed relation between the longitudinal axis of the airplane and the direction in which the transmitter is positioned is rather inadequate under certain atmospheric conditions, particularly when the airplane flies in hard weather and is laterally displaced by a sudden squall. It is therefore highly desirable to provide means for rendering this relation variable in response to the direction and the intensity of the wind in order to compensate for such lateral displacement by introducing a corresponding angular correction. The provision of a rotatable frame aerial for such correction would neither be an economical nor a practical measure, since apart from the expenditure per se for rotatable frame aerials, also the complicated means must be borne in mind which are necessarily required for remotely controlling the angular position of the frame aerial from the pilot's position. The same considerations apply to similar installations on ships.

It is an object of this invention to provide new and useful means which in a simple and reliable manner perform the aforementioned angular correction at a minimum of additional expenditure. This is realized according to the main feature of this invention by voluntarily changing the potential conditions of the antenna system or input circuit of a direction finding receiver in order to obtain asymmetric receiving diagrams for subjecting the maximum of directional reception action to an angular rotation with respect to the center of the receiving system. In accordance with a further feature of my invention, the amplitude of the effective voltage of the auxiliary non-directional antenna is changed simultaneously with a reversal of the phase condition of the frame antenna. The amplitude change thus imparted to the auxiliary antenna is preferably made variable, e. g., by the agency of a variable impedance in order to provide the possibility for arbitrarily correcting the angle between the line of maximum direction of action and the longitudinal axis of the airplane in either direction. In one specific aspect of my invention, the change of the auxiliary antenna potential is effected concurrently with a phase reversal in the frame antenna by respectively connecting to and disconnecting from said auxiliary antenna a ground potential which is adjustable at will by means of a variable differential condenser.

Figure 2:
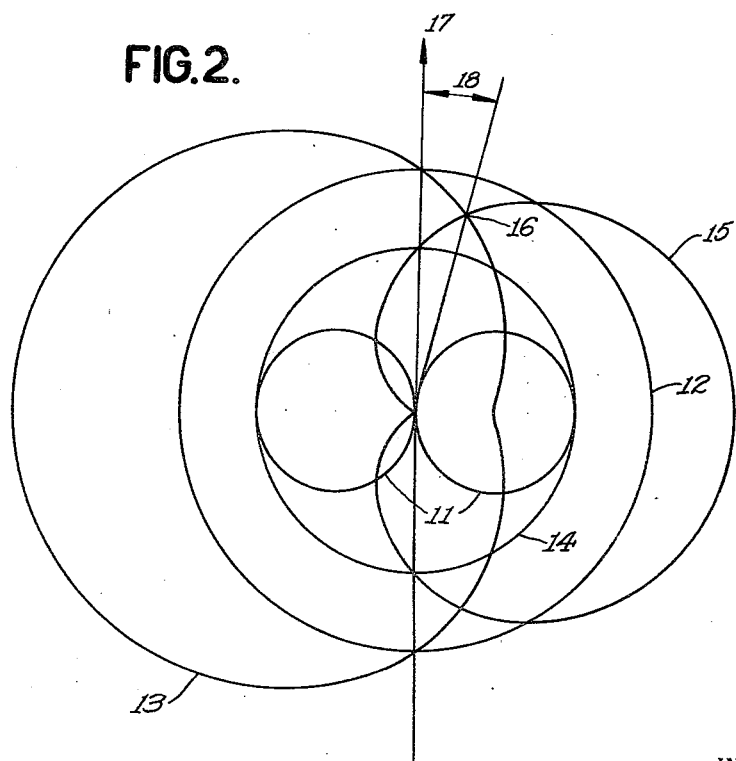

The invention will be more readily understood from the following description taken in conjunction with the accompanying drawing, in which Fig. 1 schematically shows one arrangement embodying my invention, while Fig. 2 shows diagrams obtained by the arrangement according to Fig. 1.

Referring to Fig. 1, reference numeral 1 indicates a frame antenna or aerial while reference numeral 2 denotes a non-directional auxiliary antenna. Mutually intersectiing reception diagrams are produced alternately by reversing the phase conditions of the frame aerial 1 by means of a change-over device 3. The frame aerial 1 is coupled to the input circuit 5 of the receiver through an intermediary coupling circuit 4, while the non-directional auxiliary antenna is continually coupled with the input circuit 5 through a coupling coil 6. The phasal relation between the auxiliary antenna and the frame antenna is adjusted in a known manner by means of a variable resistor 7. The potential of the auxiliary antenna 2 is according to the main feature of my invention changed concurrently with a phase reversal in the frame antenna due to the operation of the changeover device 3. This potential change is performed by switching means 8, e. g., in the form of a make and break contact which is mechanically coupled with the changeover device 3. The two switch means 3 and 8 may also be designed as rotatable switches. During the phase reversal in the frame antenna 3, the switch means 8 connects the auxiliary antenna 2 to ground over variable condenser 9 with the result that the potential of the last mentioned antenna is reduced. It is obvious that this facility introduces an asymmetry in the diagrams from which follows that the direction of maximum action is angularly displaced.

The variable condenser is preferably designed as a differential condenser, the rotatable spindle of which is so coupled with a further switching device 10, that the last mentioned device is actuated in the minimum or neutral position of the differential condenser for connecting either of the stator plates of this condenser to the contacts of the make and break switch 8. In response to the actuation of the switching device 10, the potential of the auxiliary antenna 2 is reduced in the opposite position of the changeover device 3 so that the direction of maximum action is displaced to the other side of the longitudinal axis of the airplane.

The different diagrams resulting from the heretofore described arrangement are shown in Fig. 2, in which the double circular reception diagram of the frame antenna 1 is shown at 11. The auxiliary antenna 2 at full voltage produces the circular diagram 12. The diagram 11 of the frame antenna in cooperation with the diagram 12 of the auxiliary antenna produces the cardioidal diagram 13. In response to a phase reversal in the frame antenna and a potential decrease in the auxiliary antenna by virtue of the actively connected condenser 9, also the circular diagram of this antenna is reduced so as to correspond with that shown at 14. In response to the cooperation between the frame antenna diagram 11 and the circular diagram 14 of the auxiliary antenna, the resultant diagram 15 is produced. The diagrams 13 and 15 thus produced in response to the alternate manipulations heretofore described are effective in the input circuit of the receiver and the point 16 at which the two last mentioned diagrams intersect is decisive for the maximum of directive action. The longitudinal axis of the airplane and the direction of movement thereof is indicated by arrow 17, while reference numeral 18 indicates the angle of correction thus obtained according to my invention. This angle 18 of correction may be increased by increasing the capacity of the differential condenser 9, since such increase causes the circular diagram of the auxiliary antenna to decrease with the result that the circular diagram 14 decreases and displaces the point 16 of intersection still more to the right side. With the condenser 9 in its minimum or neutral position, the direction of maximum action coincides with the longitudinal axis of the aeroplane. If the differential condenser is rotated to the other side, this condenser becomes active in the other phasal condition of the frame antenna 1 by virtue of the switching device 10, the position of which depends upon the position of the condenser spindle. In consequence to this last mentioned procedure, the angle of correction is moved or displaced to the other side of the longitudinal axis 17 of the aeroplane.

In order to still increase the capability of adjustment, additional measures may be carried out in order to likewise reduce the potential of the frame antenna during a phase reversal in said antenna. Such measures may be accomplished in a similar manner and by similar switch means, shown at 21 in Fig. 1, as heretofore described for changing the potential conditions of the auxiliary antenna. The advantage which may be obtained by also subjecting the frame antenna to a potential change consists in the fact that the angular correction heretofore mentioned may be extended over a larger angular range.

What is claimed is:

1. In a radio direction finding receiver, an input circuit, a directional frame aerial coupled to said input circuit, a non-directional auxiliary antenna likewise coupled to said input circuit, switch means connected to said frame aerial for alternately reversing the phasal relations between said frame aerial and said auxiliary antenna from phase coincidence to phase opposition, and vice versa, further switch means connected with said auxiliary antenna for changing the potential thereof during a phase reversal, and means to variably apply ground potential to said auxiliary antenna to a point on said antenna above said input circuit coupling in response to the operation of said further switch means for selectively adjusting a potential change of said auxiliary antenna to any desired value.

2. The invention according to claim 1, characterized in that said means adapted to variably apply ground potential to said auxiliary antenna is a differential variable condenser, connected between ground and the said further switch means.

3. In a radio direction finding receiver, an input circuit, a directional frame aerial coupled to said input circuit, a non-directional auxiliary antenna likewise coupled to said input circuit, switch means connected to said frame aerial for alternately reversing the phasal relations between said frame aerial and said auxiliary antenna from phase coincidence to phase opposition, and vice versa, further switch means connected with said auxiliary antenna for changing the potential thereof during a phase reversal, means adapted to variably apply ground potential to said auxiliary antenna in response to the operation of said further switch means for selectively adjusting a potential change of said auxiliary antenna to any desired value, and means for interconnecting said switch means connected to the frame aerial and said further switch means mechanically for concurrent operation.

4. In a radio direction finding receiver, an input circuit, a directional frame aerial coupled to said input circuit, a non-directional auxiliary antenna likewise coupled to said input circuit, switch means connected to said frame aerial for alternately reversing the phasal relations between said frame aerial and said auxiliary antenna from phase coincidence to phase opposition, and vice versa, and means to variably apply ground potential to said auxiliary antenna for changing the effective potential thereof during a phase reversal comprising, a variable impedance in the form of a differential condenser having two stator plates and a rotatable spindle carrying one grounded rotor plate adapted to cooperate with either of said stator plates, a contact arm electrically connected with said auxiliary antenna and mechanically coupled with said switch means for concurrent operation therewith, two contact terminals adapted to be intermittently connected with said antenna in response to the operation and position of said contact arm, and a further switching device inserted between said two contact terminals and said two condenser stator plates and mechanically actuated by the spindle of said rotor plate in its neutral position for connecting the appropriate of said stator plates to said antenna in response to the position of said contact arm.

5. The invention according to claim 4, characterized in that additional means are provided for varying the potential of said frame aerial during a phase reversal.

BRUNO KALZ.